United States Patent [19]
Gaertner et al.

[11] Patent Number: 6,072,648
[45] Date of Patent: Jun. 6, 2000

[54] SYSTEM AND METHOD FOR FORMATTING DISC SURFACES

[75] Inventors: Mark A. Gaertner, Woodbury, Minn.; Mark A. Heath, Oklahoma City, Okla.

[73] Assignee: Seagate Technology, Inc., Shakopee, Minn.

[21] Appl. No.: 08/911,322

[22] Filed: Aug. 14, 1997

[51] Int. Cl.$^7$ .............................. G11B 5/09; G11B 15/12
[52] U.S. Cl. ................................................ 360/48; 360/63
[58] Field of Search ........................................ 360/48, 63

[56] References Cited

U.S. PATENT DOCUMENTS

| | | | |
|---|---|---|---|
| 5,274,507 | 12/1993 | Lee | 360/39 |
| 5,325,506 | 6/1994 | Tohchi et al. | 360/63 |
| 5,835,299 | 11/1998 | Lee et al. | 360/76 |

OTHER PUBLICATIONS

"FARAD—A Storage System for Random Real–Time data" by N. Rouse, T. Totsuka, Y. Kato, International Broadcasting Convention, Sep. 12–16, 1996, Conference Publication No. 428, pp. 32–34, IEE, 1996.

*Primary Examiner*—W. Chris Kim
*Attorney, Agent, or Firm*—Westman, Champlin & Kelly P.A.

[57] ABSTRACT

A method formats disc surfaces in a disc drive for storage of data in a group of tracks on the disc surfaces. The disc drive performs seek operations to seek among cylinders on the disc surfaces as a function of time according to an actual seek profile. An approximation of the actual seek profile is determined such that the actual seek profile falls within the approximation. The disc surfaces are formatted according to the approximation of the actual seek profile.

14 Claims, 8 Drawing Sheets

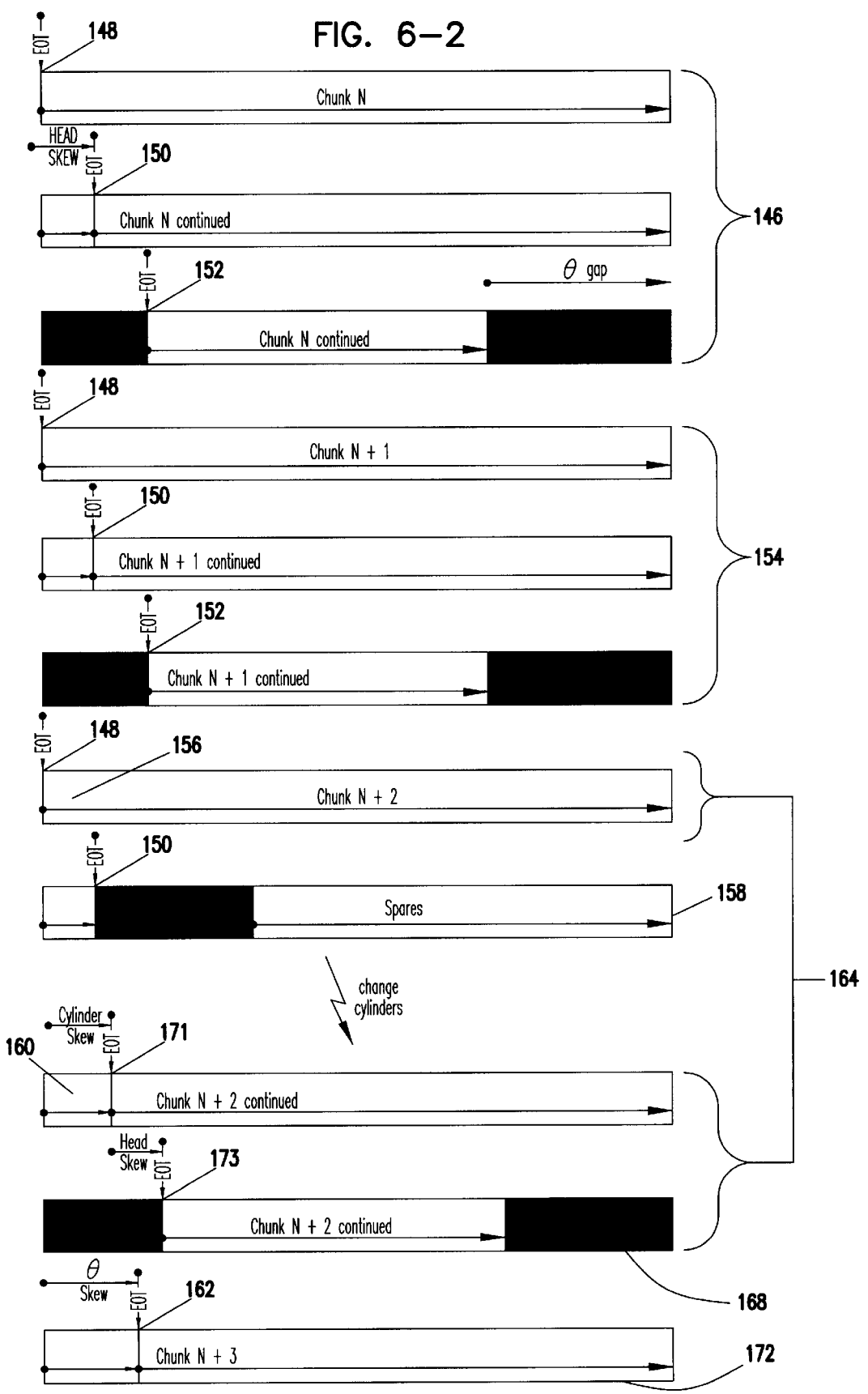

SYSTEM AND METHOD FOR FORMATTING DISC SURFACES

FIELD OF THE INVENTION

The present invention relates to disc drives. More particularly, the present invention relates to a system of formatting disc surfaces in the disc drive to better accommodate for rotational latency.

BACKGROUND OF THE INVENTION

A typical disc drive includes one or more magnetic discs mounted for rotation on a hub or spindle. A typical disc drive also includes a transducer supported by a hydrodynamic air bearing which flies above each magnetic disc. The transducer and the hydrodynamic air bearing are collectively referred to as a data head. A drive controller is conventionally used for controlling the disc drive based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of the magnetic discs. A plurality of axially aligned tracks on the disc surfaces are collectively referred to as a cylinder. Data is written to the discs by providing a write signal to one of the data heads to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is typically conditioned and then decoded by the drive controller to recover data represented by flux reversals stored on the magnetic disc, and consequently represented in the read signal provided by the data head.

In an embedded servo-type system, servo information is recorded on tracks which also contain data stored on the disc drive. The servo data (or servo bursts) are written on the data tracks and are commonly evenly temporally spaced (or angularly spaced) about the circumference of each track. Data to be stored on the disc drive is written between the servo bursts. Also, some disc surfaces include header information in header fields which are written on the disc. Header fields correspond to the servo bursts, or may number less than the servo bursts (i.e., they may correspond to every other servo burst, and so on).

As a transducer reads the servo information, the transducer provides a position signal which is decoded by a position demodulator and presented in digital form to a servo control processor. The servo control processor compares the actual radial position of the transducer over the disc (as indicated by the embedded servo burst) with desired position and commands the actuator to move in order to minimize position error. In addition, when the host system requests that the disc drive access a new portion of the disc surfaces, the servo control processor controls the disc drive to move the plurality of data heads to an appropriate cylinder to begin accessing the designated disc surface.

In large data throughput environments, such as audio and video environments, random access of the large chunks of data associated with these environments presents significant problems. The two primary components which contribute to delays in accessing data from a disc drive include the seek time, and the rotational latency. The seek time is the time required for the disc drive to seek from one cylinder to another. The rotational latency is the time required for the disc surfaces, once the data heads have been positioned over the proper cylinder, to rotate to a point where the data head over the desired track reaches the beginning of the desired data and can commence accessing data from that track.

In the past, the delays associated with seek operations have been controlled by conventional mechanisms which reorder accesses to the disc drive in servicing the requests. Accesses are conventionally reordered in a sweeping fashion from one disc radius to the other (i.e., from the inner disc radius to the outer disc radius) in order to reduce the average length of a seek operation. For instance, if the actuator arm is currently positioned near the outer diameter of the disc, then the disc drive controller rearranges access requests provided to the drive such that the actuator arm progressively moves from the outer diameter toward the inner diameter of the drive. This type of scheduling is not unique to the present invention and has been around for many years.

However, rotational latency has not to date been addressed in any meaningful fashion. Under current systems, the disc surfaces must rotate a random amount of time (or angular distance) before the data head associated with the desired disc surface arrives at the beginning of the track (or at the beginning of the next chunk of data). The maximum amount of time which can be associated with such rotation is the time associated with one revolution of the disc. Thus, the worst case access time for data in such a system is equal to the time for the seek operation plus the time for one full rotation of the disc surfaces.

The present invention addresses these and other problems, and offers other advantages over conventional, prior art systems.

SUMMARY OF THE INVENTION

Disc surfaces in a disc drive are formatted for storage of data in a group of tracks on the disc surfaces. The disc drive performs seek operations to seek among cylinders on the disc surfaces as a function of time according to an actual seek profile. An approximation of the actual seek profile is determined such that the actual seek profile falls within the approximation. The disc surfaces are formatted according to the approximation of the actual seek profile.

In one embodiment, track start positions for each of the tracks in the group of tracks storing a data chunk are skewed from track start positions for adjacent tracks in the group of tracks by a head skew angle which is sufficient for a head transition to be performed before the disc surfaces have rotated through the head skew angle.

In another embodiment, each track in a group of tracks that lies in a second cylinder are started at one of a second plurality of track start positions. Each of the second plurality of track start positions is skewed from associated ones of the first plurality of track start positions by a cylinder skew angle which is sufficient for a seek to be performed from the first cylinder to the second cylinder before the disc surfaces have rotated through the cylinder skew angle.

BRIEF DESCRIPTION OF THE DRAWINGS

FIGS. 5-1 and 5-2 illustrate skewing of tracks, in accordance with one aspect of the present invention, for data blocks which do not span, and which span, cylinder boundaries, respectively.

FIGS. 6-1 and 6-2 illustrate skewing of tracks, in accordance with one aspect of the present invention, for data blocks which do not span, and which span, spare track boundaries, respectively.

FIG. 7-1 and 7-2 is a flow diagram, employing pseudocode, and illustrating implementation of one preferred embodiment of the present invention.

DETAILED DESCRIPTION OF THE PREFERRED EMBODIMENTS

Figure 1:
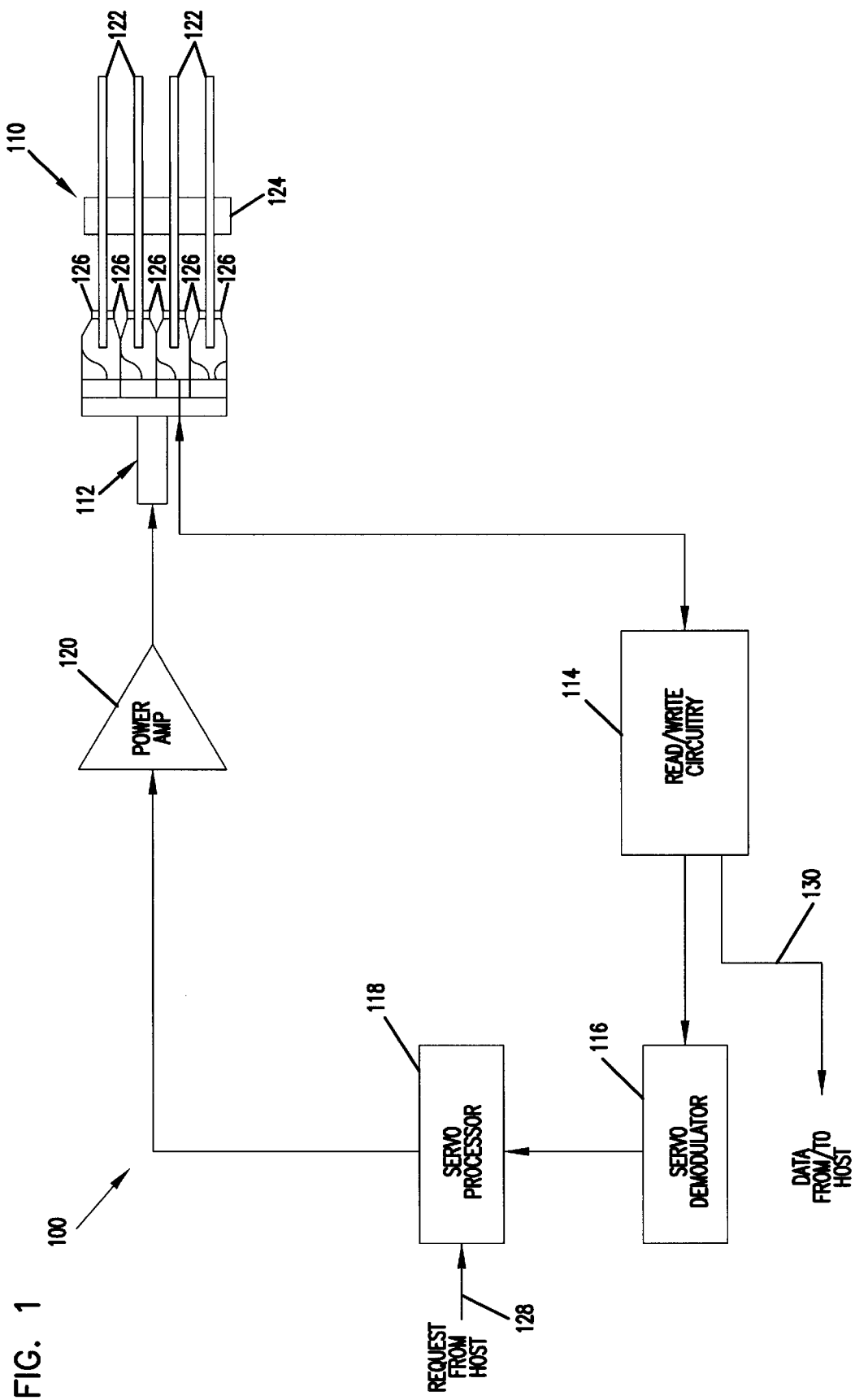
FIG. 1 is a simplified block diagram of a portion of a disc drive.

FIG. 1 is a block diagram of a portion of a disc drive 100 in accordance with the present invention. Disc drive 100 includes disc stack 110, electromechanical actuator 112, read/write circuitry 114, servo demodulator 116, servo processor 118, and power amplifier 120. The disc stack 110 includes preferably magnetically encodable discs 122, and is mounted for rotation about a spindle 124. Electromechanical actuator 112 is used to position a number of data transducers 126, radially with respect to discs 122. Preferably one transducer 126 is associated with each surface of each disc 122.

Transducers 126 read data, including servo bursts, and possibly header information, from the surfaces of their associated magnetic discs 122. The transducers 126 write data by providing a signal which represents flux reversals to be encoded on the associated surfaces of magnetic discs 122.

In order to access a portion of a disc surface under one of transducers 126, the host computer provides a request 128 to servo control processor 118. The request indicates the particular cylinder (which is comprised of a group of axially aligned tracks on the surfaces of discs 122) and track (or head) which the host desires to access. It should also be noted that the host can provide an access in any other form, and a drive controller can convert that request into the cylinder, head and sector address. Servo control processor 118 generates a position signal which is converted to an analog signal by a digital-to-analog (D/A) convertor (not shown) and applied to actuator 112 through power amplifier 120. The position signal causes actuator 112 to move transducers 120 radially with respect to the surfaces of discs 122 such that they are positioned over a desired cylinder. A specific transducer 126 is selected using appropriate multiplexing circuitry (not shown). When reading, the transducer's read signal is provided to read/write circuitry 114, which includes preamplification circuitry and other circuitry for recovering information from the read signal provided by the selected transducer 126. The information recovered by the read/write circuitry 114 includes data stored on the disc stack 110, as well as servo information written on the disc surfaces of disc stack 110. The data is provided, via output 130, to a disc drive controller or host system (not shown).

The servo information which is recovered from read/write circuitry 114 is provided to servo demodulator 116. Servo demodulator 116 decodes the servo burst to extract position information and presents that information, in digital form, to servo processor 118. The position information represents the actual position of the selected transducer 122 over its associated disc surface.

Figure 2:
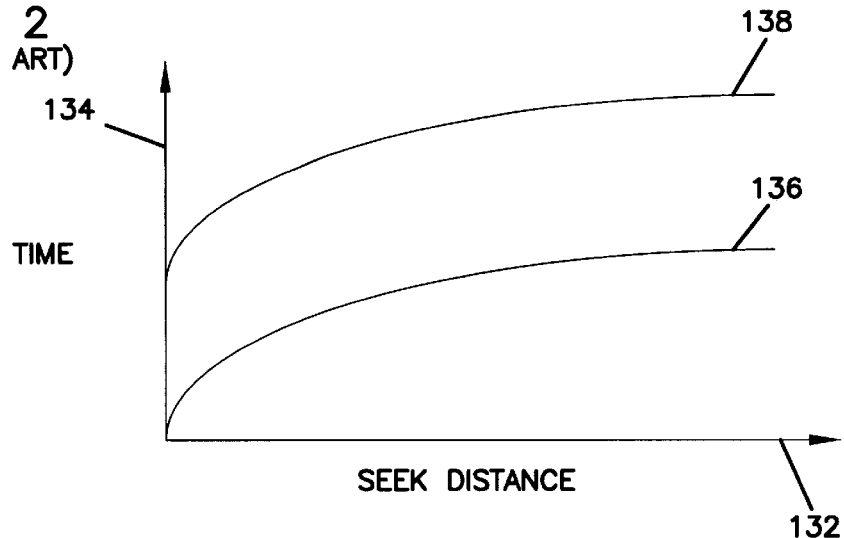
FIG. 2 is a graphical illustration of cumulative latency associated with a prior art disc drive.

FIG. 2 graphically illustrates the time required to execute a seek operation, and begin accessing one of the surfaces of discs 122, in prior art systems. FIG. 2 graphs radial seek distance over the surface of tracks 122 (e.g., in units of the number of tracks) along the X axis 132 versus time along the Y axis 134. FIG. 2 illustrates the worst case seek time.

The lower line 136 in FIG. 2 is indicative of the time for the seek. In other words, as the seek distance increases (or as the number of tracks over which the seek must be executed increases) the time required to perform the seek operation also increases. The upper line 138 which is graphed in FIG. 2 illustrates the additional (or incremental) time required for worst case rotational latency. In other words, once the disc drive has performed a seek operation such that the data heads are over the appropriate cylinder, the drive must then wait (for up to a full rotation of the disc surfaces) until the data heads are properly positioned over the desired data/sector to commence accessing the disc surfaces. Thus, the worst case rotational latency is constant, regardless of the seek time, and is substantially equal to one full rotation of the disc surfaces.

Figure 3:
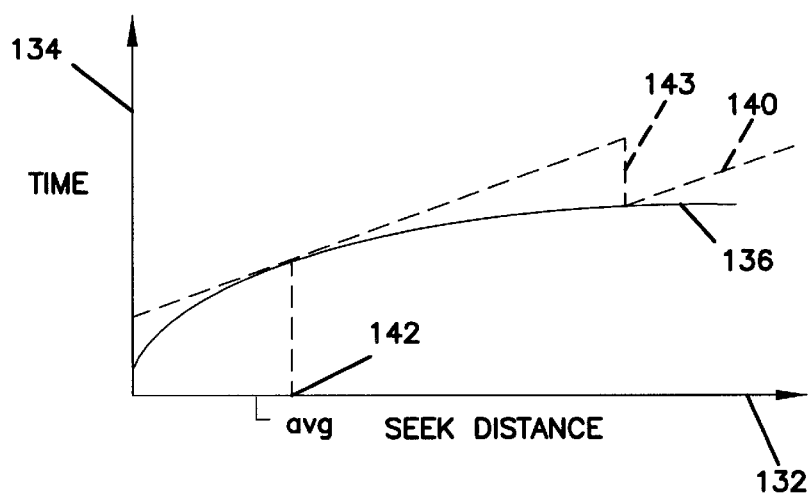
FIG. 3 graphically illustrates latency associated with a disc drive implementing one preferred embodiment of the present invention.

FIG. 3 is a graph, similar to FIG. 2 in that it graphs seek distance along the X axis 132 and time along the Y axis 134. The line 136 illustrating seek time is unchanged. However, FIG. 3 graphically illustrates one embodiment in accordance with the present invention, in which access (i.e., seek time plus rotational latency) time is represented by dashed line 140. In a preferred embodiment, the function represented by line 140 is a linear approximation of the function represented by line 136.

The present invention employs a disc formatting algorithm in which rotational delays are controlled by careful arrangement of the chunks of data to be accessed by disc drive 100 on the surfaces of discs 122. Chunks of data are preferably placed such that the time to rotate from the beginning of one chunk of data to the next is slightly greater than the seek time from one chunk to the next. Thus, when chunks are accessed by drive 100, the seek time between chunks occurs essentially behind the rotational latency. Thus, once a seek is complete, the surfaces of disc 122 need only rotate a known small distance before data heads 126 arrive at the beginning of the destination chunk.

This is accomplished by first scheduling accesses in a manner that produces a known average seek distance $L_{AVG}$. This distance corresponds to point 142 in FIG. 3. The chunks of data are then preferably arranged on the surfaces of discs 122 such that total seek and rotational delay is defined by line 140 in FIG. 3. It should be noted that, in one preferred embodiment, the rotational delay at the average seek distance 142 is approximately null, because the portion of line 140 corresponding to the distance at point 142 is tangent to the seek time represented by line 136.

Given the fact that the portion of line 140 which is tangent to line 136 can be described by the familiar equation y=mx+b, it should be noted that, in the preferred embodiment, the angular displacement (or skew) $\theta_{skew}$ between the beginning of chunks of data located on adjacent cylinders in disc drive 100 dictates the slope m of line 140, and the angular displacement (or skew) $\theta_{gap}$ between the end of one chunk of data and the beginning of a next adjacent chunk of data determines the y intercept, b, of line 140.

Line 140 illustrated by FIG. 3 can be precisely obtained by determining and specifying the logical beginning of every track in drive 100. However, different systems require different values for $\theta_{skew}$ and $\theta_{gap}$ because of different rotational speeds, seek profiles, and different data chunk sizes. Therefore, gross variations in $\theta_{gap}$ can only be totally eliminated when formatting precisely according to line 140 if layout of the servo information on the surfaces of discs 122 is uniquely altered for each given value of $\theta_{skew}$ and $\theta_{gap}$. This has not proven practical, because drive 100 would likely need to be manufactured differently for each value of $\theta_{skew}$ and $\theta_{gap}$, and this would likely preclude the user from being able to dynamically configure the drive after shipment. Further, directly specifying the logical beginning of every track would be very cumbersome since high end drives can have in excess of 100,000 tracks. This would require that an undesirably large amount of data be transferred to, and processed by, drive 100.

Figure 4:
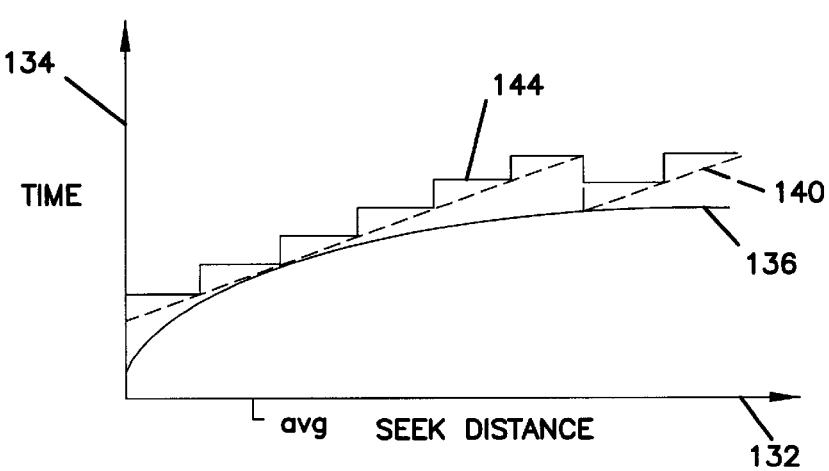
FIG. 4 graphically illustrates latency associated with a disc drive implementing a second preferred embodiment of the present invention.

Therefore, in order to eliminate this voluminous data, and provide additional flexibility for the end user system, the present invention can be embodied in another preferred embodiment, illustrated in FIG. 4, in which the layout of servo information remains unchanged on the disc drive. FIG. 4 is similar to FIG. 3, and is similarly numbered. However, an additional line 144 is illustrated in FIG. 4. Line 144 also represents an approximation of the function represented by line 136. However, line 144 is a stepwise linear approximation of line 140, instead of simply a linear approximation.

In disc drives which contain header information on every track, that header information is typically evenly angularly displaced about the track. In the embodiment represented by FIG. 4, the logical beginning of every track in drive 100 is rounded to the nearest header, for drives which contain data headers. In addition, drives which do not contain data headers contain servo information samples which are also equally angularly spaced about the track. In those drives, the logical beginning of every track is rounded to the nearest servo sample. Therefore, as with line 140, the slope m of the line 144 is represented by $\theta_{skew}$, the y intercept is represented by $\theta_{gap}$ and the height of the vertical steps in line 144 is represented by the time required for the surfaces of disc 122 to rotate between either data headers or servo samples.

Formatting the disc in accordance with the stepwise linear approximation represented by line 144 requires no change in the manufacturing of the drives and also allows the user to dynamically configure the drive to accommodate various values of $\theta_{skew}$ and $\theta_{gap}$, As will be seen in later discussion, implementing the present invention according to the function illustrated by line 144 in FIG. 4 also allows the user to indirectly specify the logical beginning of every track very efficiently and easily.

In accordance with one preferred embodiment of the present invention, the only items which the user needs to supply in order to automatically format the drive can be conveyed to drive 100 via only two parameters and two flags. The parameters include $\theta_{skew}$ (the desired angular displacement between the beginning of tracks on adjacent cylinders) and the number of tracks per chunk of data. $\theta_{gap}$ is also determined by the user and is simply controlled by using the desired portion of tracks reserved for each chunk. The flags specify whether the user will allow the chunks to span cylinder boundaries and/or spare sector boundaries. In other words, in some drives, spare tracks or sectors, or a plurality of spare tracks or cylinders, are provided either at zone boundaries (in systems using bit recording and zone sparing), or after a desired number of cylinders (in systems using region sparing). An algorithm in accordance with one aspect of the present invention uses the parameters and flags to form a step-wise linear approximation illustrated by line 144 to essentially null rotational latency for a seek profile at a given point, such as point 142.

Figures 1, 5:
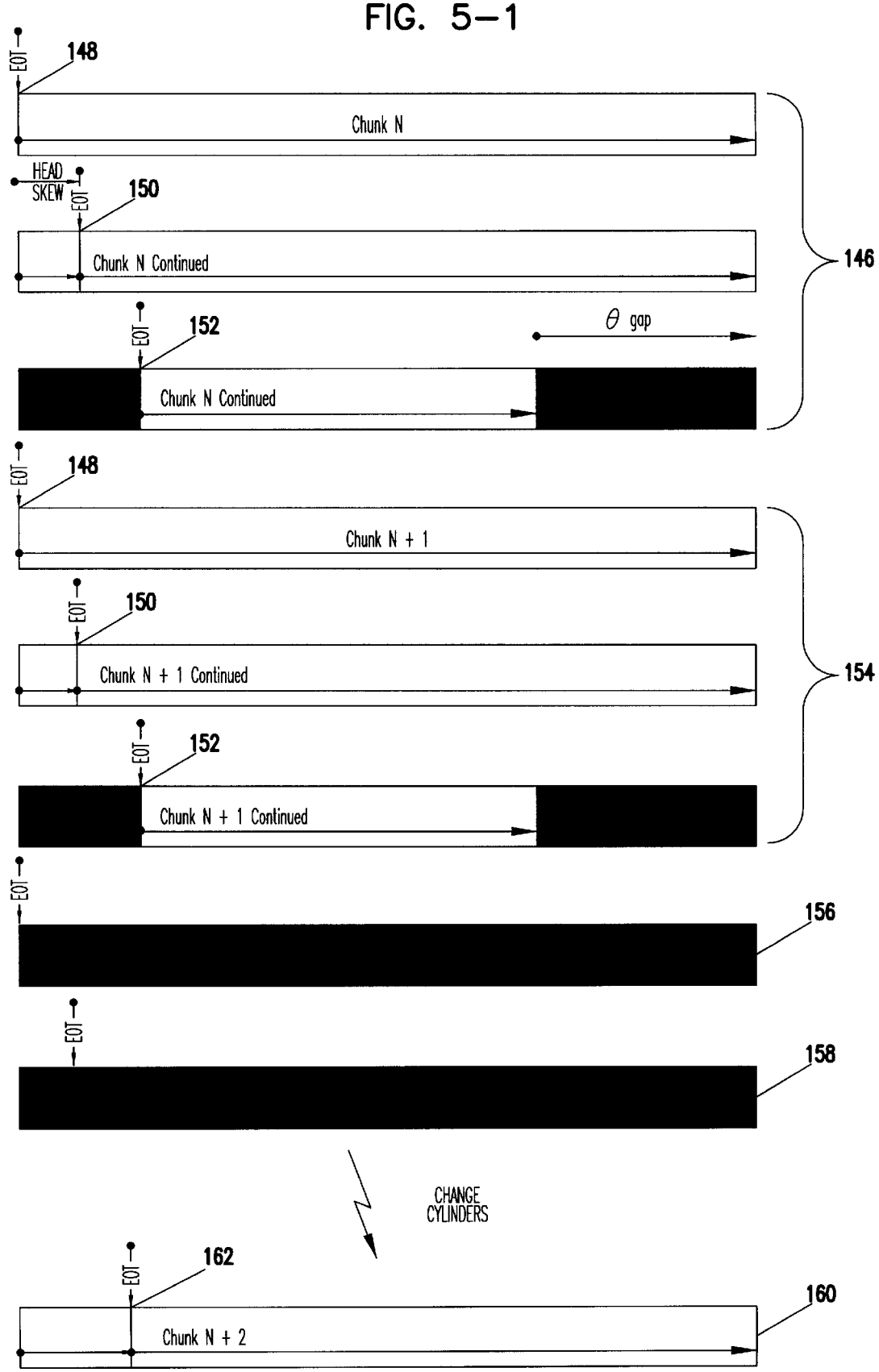
Figures 2, 5:
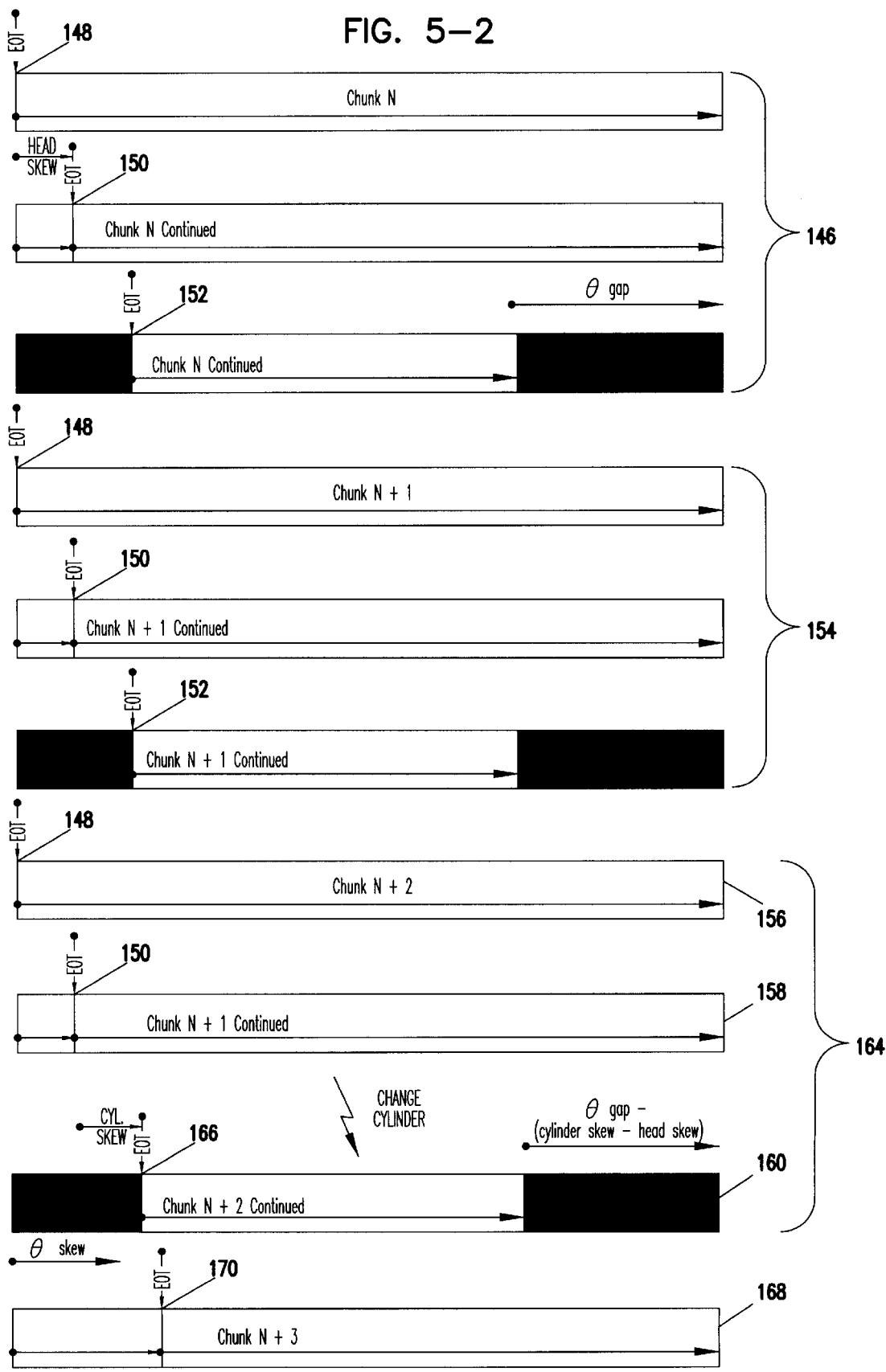

FIG. 5-1 illustrates the formatting of a plurality of tracks in which a data chunk is defined as requiring three tracks, and in which the data chunks are not allowed to span cylinder boundaries. FIG. 2 illustrates the formatting for storage of data blocks or chunks N, N+1 and N+2. The upper portion of FIG. 5-1 is associated with a first cylinder in an eight head drive. Data chunk N is stored in a first group of tracks 146. Note that, at the beginning of the first cylinder, the beginning of the first track is located at a first index position referenced by numeral 148. The beginning of the second track in group 146 is illustrated by numeral 150. The beginning of the second track is offset from the beginning of the first track by an angular displacement (or head skew) which corresponds to the distance which the disc surfaces will rotate, while the disc drive is switching between head zero and head one (i.e., while the drive is performing a head transition). The beginning of the third track in the first group 146 is referenced by numeral 152. The beginning of the third track is offset from the beginning of the first track by two head skews. Thus, as the disc drive switches from head zero, to head one, and to head two, the beginning of the adjacent subsequent tracks are offset by a head skew which is approximately equal to the distance which the disc surfaces will travel during transitioning from one head to another. Consequently, there is very little, or no, rotational latency associated with switching among the heads on a cylinder in order to access a chunk of data.

FIG. 5-1 also illustrates that the chunk of data N+1 is stored in the first cylinder on a second group of tracks 154. In the preferred embodiment, the first track in group 154 has its beginning again located at the index position referenced by numeral 148. In the preferred embodiment, the end of data chunk N is angularly separated from the beginning of data chunk N+1 by a value $\theta_{gap}$, which is typically specified by the user. Again, the beginning of the second and third tracks in group 154 are offset from the beginning of the first track in group 154 by an angular distance approximately equal to one and two head skews, respectively.

FIG. 5-1 further illustrates that two blank or wasted tracks 156 and 158 are located at the end of the first cylinder. Data chunks have been specified to require three tracks in the embodiment shown in FIG. 5-1. Since drive 100, in the embodiment illustrated in FIG. 5-1, is an eight-head drive and does not allow data chunks to span cylinder boundaries, only two chunks of data can be stored per cylinder. This eliminates some complexity from the system. However, it also increases wasted disc space in the system since two tracks per cylinder will be unused.

The beginning of data chunk N+2 thus begins on the first track 160 of the next cylinder and is represented by numeral 162. The beginning of data chunk N+2 is offset from the index position 148 (which defines the beginning of data chunks N and N+1 on the first cylinder) by angular distance $\theta_{skew}$, which is again defined by the user and represents the angular distance separating the beginning of the first track of a data chunk in adjacent cylinders.

FIG. 5-2 illustrates the formatting of a plurality of tracks in which a data chunk is defined as requiring three tracks, and in which the data chunks are also allowed to span cylinder boundaries. Similar items to those shown in FIG. 5-1 are similarly numbered. Groups of tracks 146 and 154 are similar to those shown in FIG. 5-1. However, tracks 156 and 158 are no longer empty or unused. Instead, because the data chunks are allowed to span cylinder boundaries, tracks 156 and 158 simply form the first two tracks of data chunk N+2. The beginning of tracks 156 and 158 are located at index positions 148 and 150, respectively, as are the first two tracks in groups 146 and 154. However, since track 160 is now the third track in group 164 (and the third track to hold data in chunk N+2), it cannot simply have a beginning which is offset from the beginning of the previously adjacent track 158 by a head skew. The amount of time required to seek to a next adjacent cylinder is longer than the amount of time to simply transition between heads. Therefore, the beginning of data in track 160 is moved to position 166 which is offset from the beginning 150 of track 158 by a cylinder skew. In addition, the beginning 166 of track 160 is offset from the beginning 148 of track 156 from the cumulative head skew as of the end of the cylinder, plus an additional cylinder skew. The cylinder skew, as with the head skew, corresponds to the angular distance which will be traveled during rotation of the disc surfaces while the seek operation is performed to move the data heads from the first cylinder to the second cylinder. Also, during that time, a head transition will be performed from the last data head to the first data head. However, this can be performed during the seek operation and does not add any latency in the process.

FIG. 5-2 also illustrates that the value of $\theta_{gap}$ for track 160 is reduced by the difference between a cylinder skew, and a head skew, since position 166 is offset from position 148 by one cylinder skew and one head skew, instead of simply two head skews.

In addition, FIG. 5-2 illustrates that track 168 (the second track of the second cylinder) is now the first track of data chunk N+3. The beginning of track 168 is moved back relative to the beginning of track 160 to a position indicated by reference numeral 170. Index position 170 is offset from index position 148 by the value $\theta_{skew}$. Recall that this is the value between the beginning of the first track in a data chunk in adjacent cylinders.

Figures 1, 6:
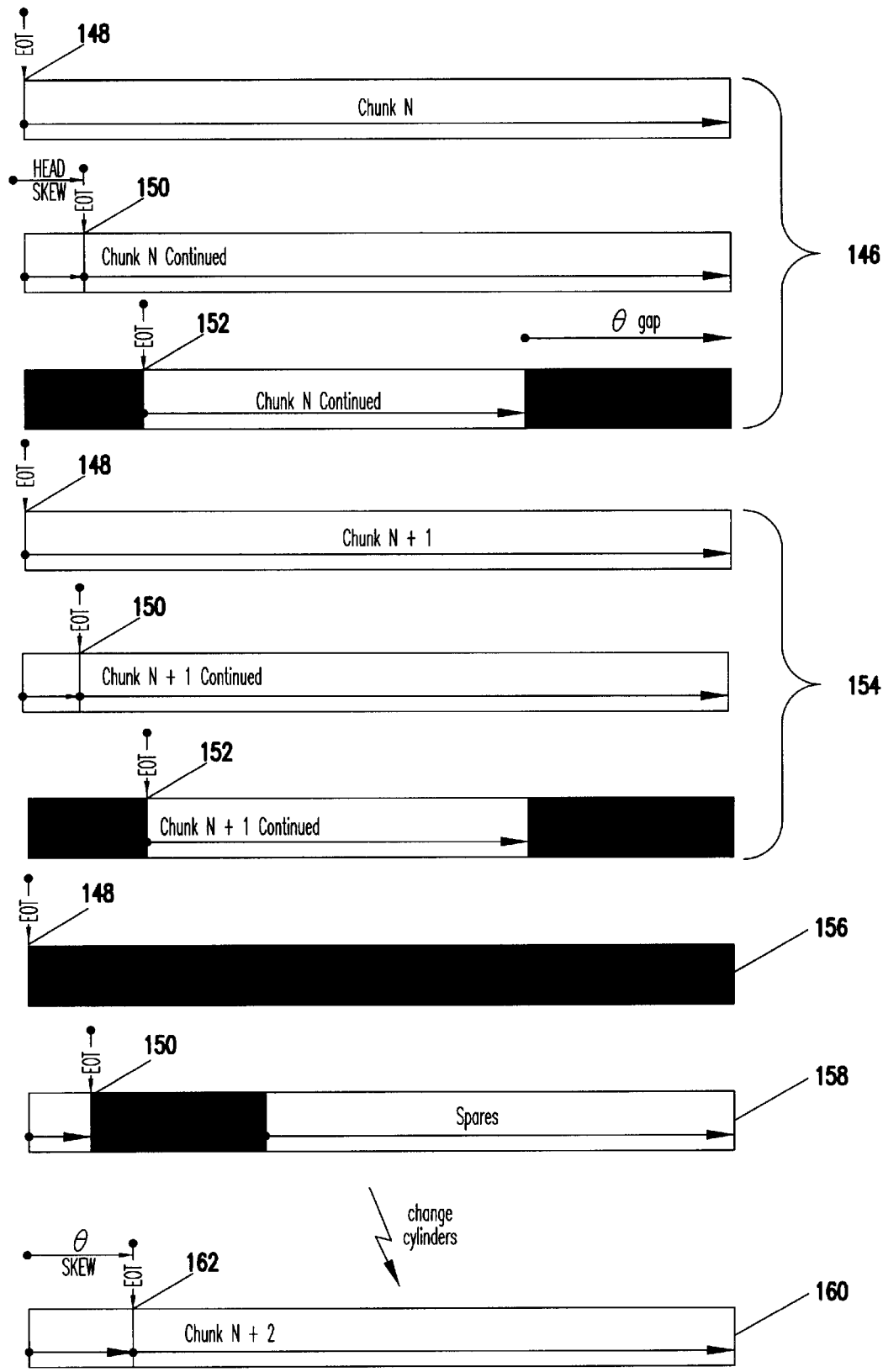

FIG. 6-1 illustrates a disc formatted for data chunks which cannot span spare boundaries. Similar items are similarly numbered to those shown in FIGS. 5-1 and 5-2. In FIG. 6-1, groups 146 and 154 of tracks hold data chunks N and N+1, in the same fashion as previously described. However, in the embodiment illustrated by FIG. 6-1, track 158 is a spare track in the first cylinder. Since the data chunks have been defined as requiring three tracks, and since the user has elected to confine storage such that the data chunks cannot span a spare track, track 156 is empty, or unused. Thus, the beginning of data chunk N+2 is stored on track 160 in the second cylinder. Again, the beginning of track 160 is illustrated by reference numeral 162 and is offset from index position 148 by $\theta_{skew}$.

FIG. 6-2 is similar to FIGS. 5-1, 5-2 and 6-1, except that it illustrates an embodiment in which data chunks are allowed to span spare tracks. FIG. 6-2 illustrates that track 156 is now used since data chunk N+2 can span spare track 158. In addition, the remaining portion of data chunk N+2 is stored on tracks 160 and 168 in the second cylinder. However, data chunk N+2 is accessed with two separate read or write commands, because the logical block addresses are not contiguous. In any case, this embodiment leads to less wasted space on the drive.

FIG. 6-2 also illustrates that the beginning of track 160 is illustrated by reference numeral 171 and is offset from index position 148, which represents the beginning of track 156, only by an angular position associated with a cylinder skew.

Again, since the cylinder skew is larger than a head skew, the beginning of track 171 is offset by the value of a cylinder skew instead of a shorter head skew. The beginning of track 168, represented by numeral 173 (the final track associated with chunk N+2) is then offset from index position 171 by a head skew, since tracks 160 and 168 are both in the same cylinder.

Again, FIG. 6-2 illustrates that the beginning of track 172, which stores the first portion of data chunk N+3, is located at index position 162, which is offset from index position 148 by $\theta_{skew}$.

Figures 1, 7:
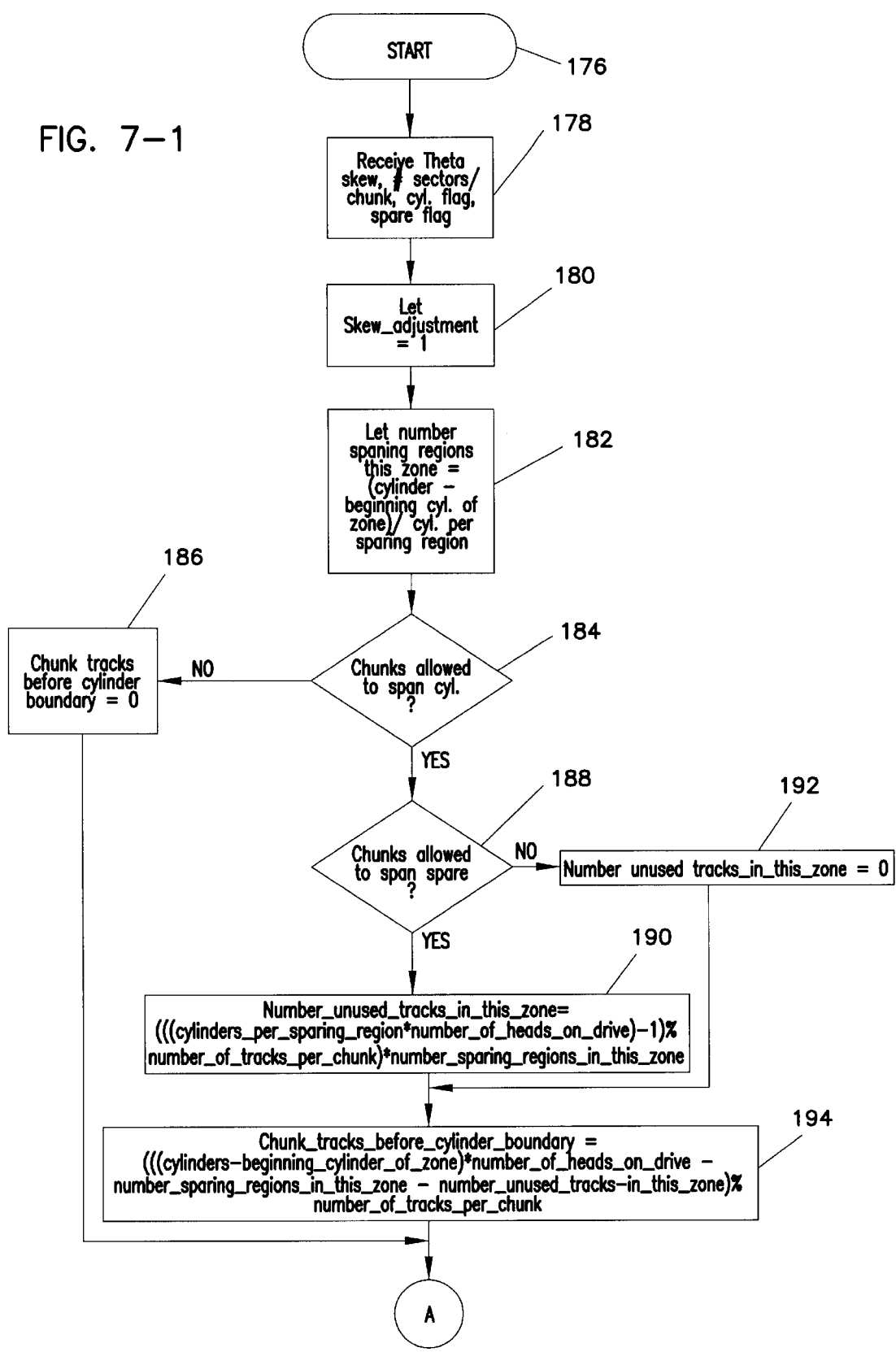
Figures 2, 7:
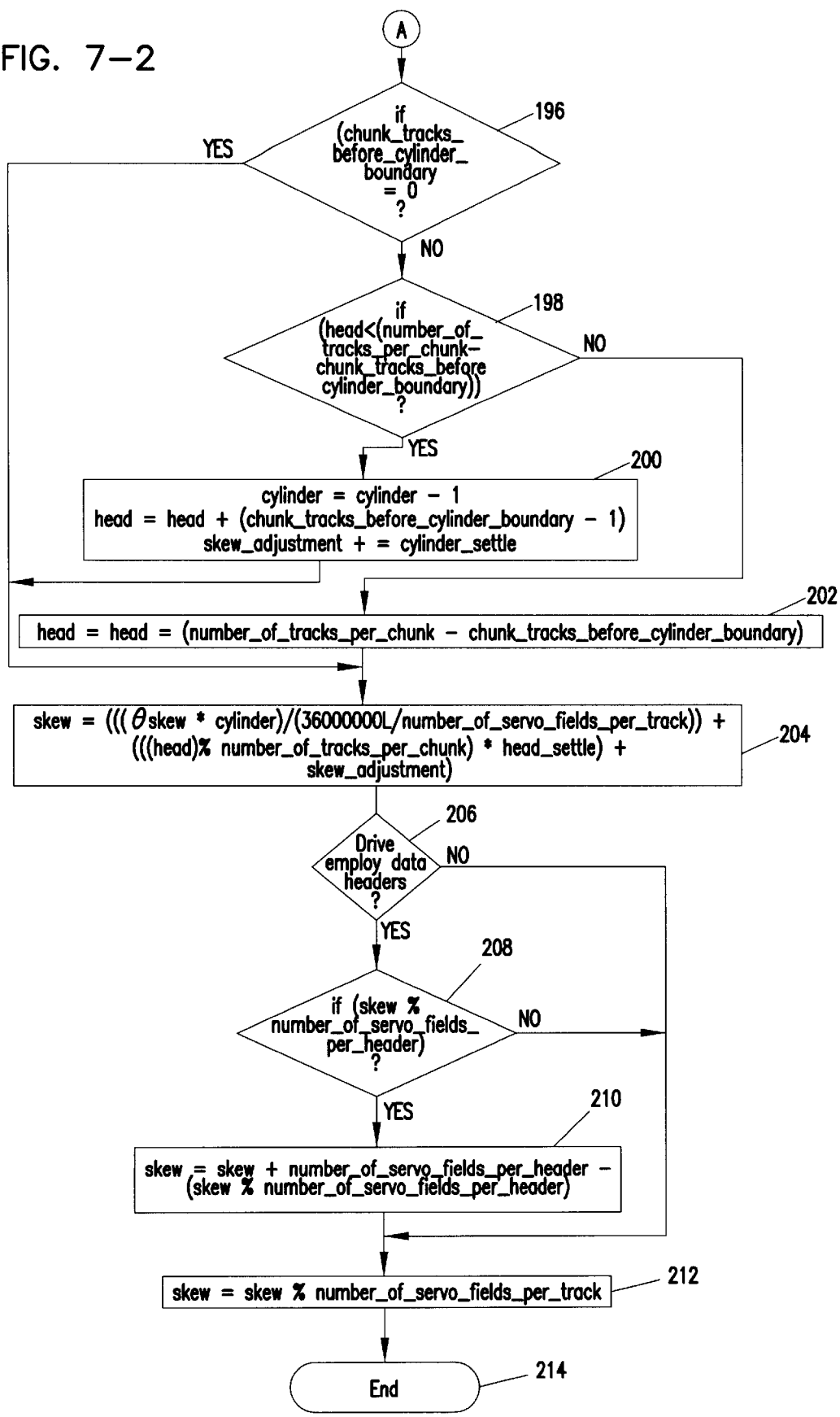

FIG. 7 is a flow diagram, from numerals 176-214 which illustrates one preferred embodiment of a technique used to determine the skew of every track on the drive which is an essential part of a drive format operation. A track is specified by cylinder and head which are inputs into the algorithm. The output of the algorithm is skew for a given track. It is assumed for the purposes of FIG. 7, that the region sparing technique employed by the drive 100 is one in which one track is reserved for spares every specified number of cylinders. If region sparing is not used, and a whole cylinder is reserved for spares at the end of each zone, then the variable Sparing_Regions_In_This_Zone which is used in the pseudocode is set equal to zero. Other sparing configurations would result in slight modifications to the formulas, as will be appreciated.

First, the values of $\theta_{skew}$ and the number of sectors per chunk, as well as the cylinder flag (indicating whether the data chunks will be allowed to span cylinder boundaries) and the spare flag (illustrating whether the data chunks will be allowed to span spare tracks) are received by drive 100. This is indicated by block 178. Allowing the data chunks to span cylinder and spare boundaries creates additional complexities to be handled by the system. However, in simpler systems, these complexities can be avoided simply by disabling the ability to span cylinder and spare boundaries. In more complex systems, this feature may be desirable since it reduces the amount of wasted disc space.

After receiving the appropriate information, a drive format operation preferably causes drive 100 to lay out the head and cylinder skews as specified by the parameters described in FIG. 7. Also, while $\theta_{skew}$ could be implemented within a single cylinder, in the preferred embodiment, and in the embodiment discussed with respect to FIG. 7, it is not. In other words, all data chunks within the same cylinder begin at an equivalent angular index position.

Once the appropriate information is received in block 178, a variable, Skew_Adjustment is set to one. This adjustment factor is set to one so that the approximating step function is always greater than line 140. This is indicated by block 180.

Next, the number of sparing regions between the beginning of the present zone and the current cylinder is computed. In other words, the algorithm illustrated by FIG. 7 is preferably employed on a disc drive which utilizes zone bit recording. The number of sparing regions in the present zone is obtained by subtracting, from the present cylinder number, the beginning cylinder of the zone, and dividing that value by the number of cylinders per sparing region. Of course, if zone bit recording is not used, then the beginning cylinder of the zone is set to zero.

It is then determined, in block 184, whether chunks will be allowed to span cylinder boundaries. This is determined by simply evaluating the cylinder flag. If not, the number of chunk tracks before the cylinder boundary is set to zero in block 186, and processing continues at block 196.

However, if the data chunks are allowed to span cylinder boundaries as illustrated by block 184, then it is determined whether the data chunks are allowed to span cylinder boundaries, but not spare boundaries. This determination is made in block 188, and it is simply made by referring to the spare flag. If not, then the number of unused tracks in the present zone is set to zero in block 192 and processing continues at block 194.

However, if the data chunks are allowed to span spare boundaries, then the number of unused tracks must be computed in order to subsequently compute the number of tracks associated with the last chunk before a cylinder boundary. The number of unused tracks are calculated in block 190 by multiplying the number of cylinders per sparing region by the number of heads on the drive, and subtracting one from that value. The resultant value is then taken MOD the number of tracks per chunk, and the resulting value (the remainder of the division) is multiplied by the number of sparing regions in this zone. The resulting value is the number of unused tracks in the present zone.

Next, the number of chunk tracks before the cylinder boundary is computed in block 194. This value is computed by subtracting the beginning cylinder of the zone from the present cylinder and multiplying that value by the number of heads on the drive. The number of sparing regions in the present zone, and the number of unused tracks in the present zone are subtracted from that value and taken MOD the number of tracks per chunk.

It is then determined, in block 196, whether this value is equal to zero to determine whether the cylinder contains a chunk that actually spans a cylinder boundary. If the number of tracks before the cylinder boundary is not equal to zero, then the cylinder does contain a chunk that spans a cylinder boundary. It is then determined if the present head is associated with the chunk that spans the cylinder boundary in block 198. This is determined by taking the head number and subtracting a value obtained by taking the number of tracks per chunk and subtracting the chunk tracks before the cylinder boundary. If the number of chunk tracks before the cylinder boundary is equal to zero, then processing continues at block 204.

If the head is less than that value, then the head must be associated with the chunk that spans the cylinder boundary. If the head is indeed associated with the chunk that spans the cylinder boundary, then the skew of the present track is computed by obtaining the skew of a track on the previous cylinder that is in the same relative chunk position as the current track (e.g., 2nd track of a chunk) and adjusting that skew by a cylinder settle (or cylinder skew).

This is done in block 200. The cylinder number is set to the cylinder number minus one. The head number is set to the head number plus the number of chunk tracks before the cylinder boundary minus one. The skew adjustment value is set to the skew adjustment value plus the cylinder settle value.

If, in block 198, it is determined that the head is on a cylinder which contains a chunk that spans a cylinder boundary, but the head is not associated with that chunk, then the head must be adjusted back to negate the impact of the partial chunk. This is indicated in block 202 (and also illustrated by track 168 in FIG. 5-2). The head number is set to the head number less a value obtained by subtracting from the number of tracks per chunk the chunk tracks before the cylinder boundary.

Then, the skew for the present head on the present cylinder is set. This value is influenced by the skew associated with the cylinder, and the skew associated with the head, plus any computed adjustment factor. This is indicated by block 204. The skew is set to a value which is first obtained by multiplying $\theta_{skew}$ by the cylinder number and dividing that by 3,600,000 divided by the number of servo fields per track. The reason that the value is divided by 3,600,000 is that $\theta_{skew}$ is preferably defined in 1/10,000th of a degree. The resulting value is then added to the value of the head number taken MOD the number of tracks per chunk which is itself multiplied by the head settle (or head skew) plus any skew adjustment factor.

After the skew is determined, it is then determined, in block 206, whether the present drive employs data headers. If the drive does employ data headers, then the skew needs to be modified to ensure that it falls on a data header. Thus, if the drive does not employ data headers, processing continues at block 212. However, if the drive does employ data headers, then the skew determined in block 204 is taken MOD the number of servo fields per header in block 208. If that value is not zero, then the skew value is adjusted by adding the number of servo fields per header less the value determined in block 208. This is indicated by block 210.

Finally, one additional check is performed. The skew value can be no larger than the number of servo fields on a track. Therefore, the skew value is set to the skew value taken MOD the number of servo fields per track as indicated in block 212. This skew specifies the logical beginning of the track in units of servo information samples (i.e., servo fields).

Once the skew value is obtained, logical user chunks of data to be written to the drive must be converted to drive logical block addresses by the system. This can be done in any suitable manner. For example, in one preferred embodiment, let the following variables be defined:

| | |
|---|---|
| N = | logical chunk number (0, 1, 2, . . . ) |
| LBA = | logical block address of chunk N |
| TPC = | tracks per chunk |
| H = | number of heads on the drive |
| Z = | zone of chunk N-1 |
| ZC = | starting logical cylinder of zone of chunk N-1 |
| ZSLBA = | starting LBA of zone of chunk N-1 |
| ZSPT = | sectors per track of zone of chunk N-1 |
| CPSR = | cylinders per sparing region |
| SPR = | spares per region |
| TCC = | tracks consumed by chunks 0 to N-1 |
| SCCZ = | sectors consumed between start of zone to chunk N |
| TCS = | tracks consumed by spares between chunks 0 to N |
| TCSZ = | tracks consumed by spares between start of zone to chunk N |
| SCSZ = | sectors consumed by spares between start of zone to chunk N |
| CCC = | cylinders consumed by chunks 0 to N-1 |

The following calculations are only true for N>0, since there is no chunk N-1 if N=0. Of course, the starting logical block address (LBA) for a chunk N is always 0.

First, compute the number of tracks consumed by chunks 0 to N-1. This is equal to the logical number of the chunk times the number of tracks per chunk as follows:

$$TCC = N*TPC \qquad \text{Eq. 1}$$

Then, if the chunks can span spare boundaries, the number of tracks consumed by the spares between chunks 0 to N is equal to the number of tracks consumed by chunks N to N−1 divided by the number of tracks that do not contain spares per sparing region. This is indicated by Equation 2.

$$TCS=TCC/((CPSR*H)-1) \qquad \text{Eq. 2}$$

If the chunks cannot span spare boundaries, then unused tracks are created. The number of unused tracks due to the spares per sparing region is equal to the remainder of tracks per sparing region divided by the number of tracks per chunk. Therefore, the total number of unused tracks resulting from spares between chunks 0 to N is equal to the number of tracks consumed by spares plus the total number of tracks consumed by spares times the number of unused tracks per sparing region as follows:

$$TCS=(TC/((CPSR*H)-1))*(1+((CPSR*H)-1)\%TPC) \qquad \text{Eq. 3}$$

It should be noted that Equation 3 implicitly limits the chunk size to less than a sparing region size (i.e., TPC is less than CPSR*H). It should also be noted that the % symbol corresponds to the MOD function.

The number of cylinders consumed by chunks 0 to N−1 is equal to the total number of tracks consumed by chunks and spares divided by the number of heads:

$$CCC=(TCC+TCS)H \qquad \text{Eq. 4}$$

Chunk N−1 resides in the zone with the larger starting logical cylinder that is less than or equal to CCC.

Table 1 illustrates a zone table for a typical drive, in which the starting logical cylinder does not count the cylinders between zones (if any). The zone table will vary depending on sector size.

TABLE 1

| Zone | Starting Logical Cylinder | Starting LBA | 512 Byte Sectors/ Track |
|---|---|---|---|
| 0 | 0 | 0 | 199 |
| 1 | 1176 | 4661664 | 192 |
| 2 | 1172 | 6864288 | 178 |
| 3 | 2676 | 10138944 | 164 |
| 4 | 3522 | 12900288 | 151 |
| 5 | 4206 | 14955024 | 138 |
| 6 | 4782 | 16535568 | 126 |

The logical block address for chunk N is equal to:

$$LBA=ZSLBA+SCCZ+SCSZ \qquad \text{Eq. 5}$$

It is necessary to know the number of tracks consumed by spares between the start of the zone to chunk N (TCSZ) in order to compute the number of sectors consumed between the start of the zone to chunk N (SCCZ) and the number of sectors consumed by spares between the start of the zone to chunk N (SCSZ). The number of tracks consumed by spares between the start of the zone to chunk N is equal to the number of cylinders consumed in the zone divided by the number of tracks that do not contain spares per sparing region. Thus:

$$TCSZ+(H*(CCC-ZC))/((CPSR*H)-1) \qquad \text{Eq. 6}$$

SCCZ is equal to the number of tracks consumed by chunks between the start of the zone to chunk N times the number of sectors per track. Therefore:

$$SCCZ=(((CCC-ZA)*H)-TCSZ)*ZSPT \qquad \text{Eq. 7}$$

If the chunks can span spare boundaries, then SCSZ is equal to the number of tracks consumed by spares between the start of the zone to chunk N multiplied by the number of unused sectors on the tracks that contains spares. Therefore:

$$SCSZ=TCSZ*(ZSPT-SPR) \qquad \text{Eq. 8}$$

Finally, if chunks cannot span spares, then SCSZ is equal to the number of tracks consumed by spares between the start of the zone to chunk N multiplied by the number of unused sectors on the tracks that contain spares plus the number of unused tracks due to the spares between the start of the zone to chunk N times the number of sectors per track. This is illustrated as follows:

$$SCSZ=(TCSZ*(ZSPT-SPR))+((TCSZ*((CPSR*H)-1)\%TPC))*ZSPT) \qquad \text{Eq. 9}$$

Therefore, with these values, LBA in Equation 5 can be obtained.

Thus, the present invention provides a system by which a drive can be formatted that is highly efficient and effective. Only two parameters and two flags are required to configure the layout of the track and cylinder skews. The system allows for an optimum amount of used disc space, results in a reasonably constant $\theta_{gap}$, and approximates the linear slope defined by $\theta_{skew}$ preferably as a step function. The benefits of approximating $\theta_{skew}$ as a step function greatly outweigh the resulting slight increase of rotational delay. By using a step function, the position of the servo information samples remains unchanged. Consequently no change in the manufacturing process is necessary, and the drive can be dynamically configured to substantially any format.

A system of formatting a plurality of disc surfaces such as discs 122 in a disc drive 100 enable the discs to receive data in an efficient manner. Each disc surface has a data head 126 and a plurality of tracks accessed by the data heads 126. Corresponding tracks on the disc surfaces of discs 122 comprise a cylinder and are accessed by performing a head transition from accessing a track in the cylinder with one of the plurality of data heads 126 to accessing a track in the cylinder with another of the plurality of data heads 126. The data is formed of data chunks, each data block being stored in a group of tracks. The system preferably includes starting each track in a group of tracks (such as groups 146 and 154) that lie in a first cylinder at one of a first plurality of track start positions 148, 150 and 152. The track start position for each of the tracks in the group of tracks is skewed from the track start positions for adjacent tracks in the group of tracks by a head skew angle which is sufficient for a head transition to be performed before the disc surfaces of the discs 122 have rotated through the head skew angle.

In another embodiment, the tracks in a group of tracks that lie in a second cylinder are started at one of a second plurality of start positions, each of the second plurality of start positions 162 being skewed from associated ones of the first plurality of track start positions 148 by a cylinder skew angle which is sufficient for a seek to be performed from the first cylinder to the second cylinder before the disc surfaces of discs 122 have rotated through the cylinder skew angle.

In one embodiment the second cylinder is offset from the first cylinder by an average seek distance 142 which corresponds to an approximate average distance of seek operations performed by the disc drive 100.

In a further embodiment, each of the tracks includes a plurality of angularly spaced header fields and wherein the starting positions of the tracks are separated from ending positions of previously adjacent tracks by an angular displacement which is less than a sum of the cylinder skew angle plus an angular displacement between adjacent servo samples (as illustrated by block 204 in FIG. 7). Further, in another preferred embodiment, the tracks include a plurality of angularly spaced header fields and wherein the starting positions of the tracks are chosen so that they follow one of the plurality of header fields which is angularly separated from an end of the previously adjacent track in the group of tracks by more than the head skew angle for the tracks (as indicated by block 210 of FIG. 7).

In addition, the present invention allows data blocks (or chunks) to span cylinder and spare boundaries. Where the data spans a cylinder boundary, the beginning of the first track that lies on an opposite side of the cylinder boundary from a previously adjacent track is angularly spaced from the end of the previously adjacent track by an adjacent cylinder skew angle which is sufficient so that a seek to a cylinder containing the track can be executed before the disc surfaces rotate through the adjacent cylinder skew angle (as indicated by block 204 in FIG. 7).

In yet another preferred embodiment, the method according to the present invention determines an approximation of the actual seek profile of a disc drive such that the actual seek profile (line 136 in FIG. 2) falls within the approximation (143 or 144). The disc surfaces are then formatted according to the approximation of the actual seek profile.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. In addition, although the preferred embodiment described herein is directed to a magnetic disc drive system, it will be appreciated by those skilled in the art that the teachings of the present invention can be applied to other systems, like optical systems, without departing from the scope and spirit of the present invention.

What is claimed is:

1. A method of formatting a plurality of disc surfaces in a disc drive to receive data, each disc surface having a data head and a plurality of tracks accessed by the data heads, corresponding tracks on the disc surfaces comprising a cylinder and being accessed by performing a head transition from accessing a track in the cylinder with one of the plurality of data heads to accessing a track in the cylinder with another of the plurality of data heads, the data being formed of data chunks, each data chunk being stored in a group of tracks, the method comprising:

starting each track in a group of tracks that lies in a first cylinder at one of a first plurality of track start positions, the track start position for each of the tracks in the group of tracks being skewed from track start positions for adjacent tracks in the group of tracks by a head skew angle which is sufficient for a head transition to be performed before the disc surfaces have rotated through the head skew angle, wherein each track in the group of tracks includes a plurality of angularly spaced header fields and wherein starting each track comprises:

determining the head skew angle for the tracks in the group of tracks; and choosing the track start position for the tracks to follow one of the plurality of header fields angularly separated from an end of a previously adjacent track in the group of tracks by more than the head skew angle for the tracks, and by less than a sum of the head skew angle plus an angular displacement between adjacent header fields.

2. The method of claim 1 and further comprising:

starting each track in a group of tracks that lie in a second cylinder, radially spaced from the first cylinder by a known distance, at one of a second plurality of track start positions, each of the second plurality of track start positions being skewed from associated ones of the first plurality of track start positions by a cylinder skew angle which is sufficient for a seek to be performed from the first cylinder to the second cylinder before the disc surfaces have rotated through the cylinder skew angle.

3. The method of claim 2 wherein the second cylinder is offset from the first cylinder by an average seek distance which corresponds to an approximate average distance of seek operations performed by the disc drive.

4. The method of claim 2 wherein the discs are formatted such that data is recorded on the disc surfaces according to zone bit recording and further comprising:

determining a head skew angle and a cylinder skew angle corresponding to each zone on the disc surface.

5. The method of claim 2 wherein the track start positions for the group of tracks lying in the first cylinder is separated from the track start positions in the group of tracks lying in the second cylinder by an angular displacement which is less than a sum of the cylinder skew angle plus an angular displacement between adjacent header fields.

6. The method of claim 2 wherein each of the tracks includes a plurality of angularly spaced servo samples, and wherein starting each track in the group of tracks lying in the second cylinder comprises:

determining the cylinder skew angle for the second cylinder; and choosing the track start position for the tracks in the group lying in the second cylinder to follow one of the plurality of servo samples which is angularly separated from the starting position of a corresponding track in the group of tracks lying in the first cylinder by more than the cylinder skew angle for the second cylinder, and by less than a sum of the cylinder skew angle plus an angular displacement between adjacent servo samples.

7. The method of claim 1 and further comprising:

starting each track in a second group of tracks that lies in the first cylinder at one of a second plurality of track start positions, the track start position for each of the tracks in the second group of tracks being approximately equal to the track start positions for corresponding tracks in the first group of tracks.

8. The method of claim 1 wherein the track start position for a track in the group of tracks that lies on an opposite side of a cylinder boundary from a previously adjacent track in the group of tracks is angularly spaced from the end of the previously adjacent track by an adjacent cylinder skew angle which is sufficient so that a seek to a cylinder containing the track can be executed before the disc surfaces rotate through the adjacent cylinder skew angle.

9. The method of claim 1 wherein the disc surfaces include spare tracks which are not to be formatted to receive data, and wherein the data track start position for a track in the group of tracks that lies on an opposite side of a spare track form a previously adjacent track in the group of tracks is angularly spaced from the end of the previously adjacent track by a spare skew angle which is sufficient so that at least two head transitions and a seek to a cylinder containing the track can be executed before the disc surfaces rotate through the spare skew angle.

10. A disc drive, comprising:

a plurality of disc surfaces suitable for receiving data;

a plurality of data heads, each disc surface having a plurality of tracks accessible by the data heads, corresponding tracks on the disc surfaces comprising a cylinder;

a head selector accessing one of the plurality of data heads by performing a head transition from accessing a track in the cylinder with one of the plurality of data heads to accessing a track in the cylinder with another of the plurality of data heads, the data being formed of data chunks, each data chunk being stored in a group of tracks; and a formatter configured to start each track in a group of tracks that lies in a first cylinder at one of a first plurality of track start positions, the formatter further configured to skew a track start position for each of the tracks in the group of tracks from track start positions for adjacent tracks in the group of tracks by a head skew angle which is sufficient for a head transition to be performed before the disc surfaces have rotated through the head skew angle, wherein the formatter is configured to start each track at a nearest angularly spaced header field which is skewed by a sufficient head skew angle when the disc surfaces include header fields, and to start each track at a nearest angularly spaced servo sample which is skewed by a sufficient head skew angle when the disc surfaces are headerless.

11. The disc drive of claim 10 wherein the formatter is further configured to start each track in a group of tracks that lie in a second cylinder, radially spaced from the first cylinder by a known distance, at one of a second plurality of track start positions, the formatter being configured to skew each of the second plurality of track start positions from associated ones of the first plurality of track start positions by a cylinder skew angle which is sufficient for a seek to be performed from the first cylinder to the second cylinder before the disc surfaces have rotated through the cylinder skew angle.

12. A method of formatting a plurality of disc surfaces in a disc drive to receive data, each disc surface having a data head and a plurality of tracks accessed by the data heads, corresponding tracks on the disc surfaces comprising a cylinder and being accessed by performing a head transition from accessing a track in the cylinder with one of the plurality of data heads to accessing a track in the cylinder with another of the plurality of data heads, the data being formed of data chunks, each data chunk being stored in a group of tracks, the method comprising:

starting each track in a group of tracks that lies in a first cylinder at one of a first plurality of track start positions, the track start position for each of the tracks in the group of tracks being skewed from track start positions for adjacent tracks in the group of tracks by a head skew angle which is sufficient for a head transition to be performed before the disc surfaces have rotated through the head skew angle, wherein each track in the group of tracks includes a plurality of angularly spaced servo samples and wherein starting comprises:

determining the head skew angle for the tracks; and choosing the track start position for the tracks to follow one of the plurality of servo samples angularly separated from an end of a previously adjacent track by more than the head skew angle for the tracks, and by less than a sum of the head skew angle plus an angular displacement between adjacent servo samples.

13. A method of formatting a plurality of disc surfaces in a disc drive to receive data, each disc surface having a data head and a plurality of tracks accessed by the data heads, corresponding tracks on the disc surfaces comprising a cylinder and being accessed by performing a head transition from accessing a track in the cylinder with one of the plurality of data heads to accessing a track in the cylinder with another of the plurality of data heads, the data being formed of data chunks, each data chunk being stored in a group of tracks, the method comprising:

starting each track in a group of tracks that lies in a first cylinder at one of a first plurality of track start positions, the track start position for each of the tracks in the group of tracks being skewed from track start positions for adjacent tracks in the group of tracks by a head skew angle which is sufficient for a head transition to be performed before the disc surfaces have rotated through the head skew angle, wherein the track start position for a track in the group of tracks that lies on an opposite side of a cylinder boundary from a previously adjacent track in the group of tracks is angularly spaced from the end of the previously adjacent track by an adjacent cylinder skew angle which is sufficient so that a seek to a cylinder containing the track can be executed before the disc surfaces rotate through the adjacent cylinder skew angle.

14. A method of formatting a plurality of disc surfaces in a disc drive to receive data, each disc surface having a data head and a plurality of tracks accessed by the data heads, corresponding tracks on the disc surfaces comprising a cylinder and being accessed by performing a head transition from accessing a track i.n the cylinder with one of the plurality of data heads to accessing a track in the cylinder with another of the plurality of data heads, the data being formed of data chunks, each data chunk being stored in a group of tracks, the method comprising:

starting each track in a group of tracks that lies in a first cylinder at one of a first plurality of track start positions, the track start position for each of the tracks in the group of tracks being skewed from track start positions for adjacent tracks in the group of tracks by a head skew angle which is sufficient for a head transition to be performed before the disc surfaces have rotated through the head skew angle, wherein the disc surfaces include spare tracks which are not to be formatted to receive data, and wherein the data track start position for a track in the group of tracks that lies on an opposite side of a spare track form a previously adjacent track in the group of tracks is angularly spaced from the end of the previously adjacent track by a spare skew angle which is sufficient so that at least two head transitions and a seek to a cylinder containing the track can be executed before the disc surfaces rotate through the spare skew angle.

* * * * *